(12) United States Patent
Correia

(10) Patent No.: US 7,121,793 B2
(45) Date of Patent: Oct. 17, 2006

(54) UNDERCUT FLANGE TURBINE NOZZLE

(75) Inventor: Victor Hugo Silva Correia, Milton Mills, NH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/937,643

(22) Filed: Sep. 9, 2004

(65) Prior Publication Data

US 2006/0051201 A1    Mar. 9, 2006

(51) Int. Cl.
*F01D 9/02*    (2006.01)

(52) U.S. Cl. .............. 415/191; 415/209.4; 415/210.1; 416/192

(58) Field of Classification Search ............. 415/191, 415/208.2, 209.3, 209.4, 210.1; 416/189, 416/191, 192, 193 R, 193 A
See application file for complete search history.

(56) References Cited

U.S. PATENT DOCUMENTS

| | | | |
|---|---|---|---|
| 3,475,107 A | 10/1969 | Auxier | |
| 4,187,054 A | 2/1980 | Landis, Jr. et al. | |
| 4,702,670 A | 10/1987 | Winter | |
| 4,767,260 A | 8/1988 | Clevenger et al. | |
| 5,211,536 A | 5/1993 | Ackerman et al. | |
| 5,372,476 A | 12/1994 | Hemelgarn et al. | |
| 5,618,161 A | 4/1997 | Papageorgiou et al. | |
| 5,634,766 A * | 6/1997 | Cunha et al. | 415/191 |
| 5,997,245 A | 12/1999 | Tomita et al. | |
| 6,418,618 B1 * | 7/2002 | Burdgick | 29/889 |
| 6,558,115 B1 * | 5/2003 | Tiemann | 415/191 |

FOREIGN PATENT DOCUMENTS

| | | |
|---|---|---|
| EP | 0 560 296 A1 | 9/1993 |
| EP | 1 146 201 A2 | 10/2001 |
| GB | 1 135 879 | 12/1968 |

\* cited by examiner

*Primary Examiner*—Edward K. Look
*Assistant Examiner*—Richard A. Edgar
(74) *Attorney, Agent, or Firm*—William S. Andes; Francis L. Conte

(57) ABSTRACT

A turbine nozzle includes a vane joined to opposite inner and outer bands. The inner band includes a pocket adjoining a flange which recesses in part the inner surface of the band. The pocket undercuts the flange to form a notch at the base thereof.

20 Claims, 3 Drawing Sheets

UNDERCUT FLANGE TURBINE NOZZLE

BACKGROUND OF THE INVENTION

The present invention relates generally to gas turbine engines, and more specifically, to turbine nozzles therein.

In a gas turbine engine, air is pressurized in a compressor and mixed with fuel in a combustor for generating hot combustion gases. Energy is extracted from the combustion gases in various turbine stages for powering the compressor and producing working by powering an upstream fan in a typical turbofan aircraft engine application.

The high pressure turbine of the engine includes a turbine nozzle at the outlet end of the combustor which channels the combustion gases into a row of first stage turbine rotor blades mounted to a supporting rotor disk which in turn drives the compressor during operation. The turbine nozzle includes a row of hollow airfoil vanes extending radially between inner and outer bands.

The nozzle is supported in the engine either at its outer band or at its inner band, and is typically formed in circumferential segments for accommodating thermal expansion and contraction as the hot gases are discharged from the combustor and between the nozzle vanes. All of the nozzle components are cooled during operation by using a portion of the pressurized air bled from the compressor in various cooling circuits.

For example, the nozzle vanes are hollow, and compressor discharge air is circulated therein for internal cooling thereof. The sidewalls of the vanes include various rows of film cooling holes through which the spent cooling air is discharged from inside the hollow vanes in thin films of cooling air along the external surfaces of the vanes for providing thermal insulation thereof.

The inner and outer bands of the nozzle are also cooled by the compressor discharge air in additional cooling circuits. However, the bands are relatively thin and are typically cooled by channeling the cooling air over the outboard surfaces thereof, with film cooling holes extending through the bands to the inboard surfaces thereof which confine radially the combustion gas flow therebetween.

The inner and outer bands typically include radially extending flanges which cooperate with adjoining components of the engine for both mounting and sealing the turbine nozzle therewith. Although the flanges are not directly exposed to the hot combustion gases of the turbine flowpath, they provide additional weight and thermal mass which affect performance of the engine.

Weight is the paramount design feature in an aircraft engine and must be minimized for maximizing efficiency of the engine. Thermal mass affects thermal stresses generated during operation, and also affects the durability and life of the turbine nozzle.

A flange configured for sealing a nozzle band to adjacent components may be relatively thin and lightweight, and is relatively easy to cool. However, a flange configured for mounting or supporting the turbine nozzle is relatively thick for carrying the substantial reaction loads through the supporting loadpath, and is therefore more difficult to cool in view of its larger thermal mass and weight.

Accordingly, it is desired to provide a turbine nozzle having an improved supporting flange with selectively reduced thermal mass and weight.

BRIEF DESCRIPTION OF THE INVENTION

A turbine nozzle includes a vane joined to opposite inner and outer bands. The inner band includes a pocket adjoining a flange which recesses in part the inner surface of the band. The pocket undercuts the flange to form a notch at the base thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
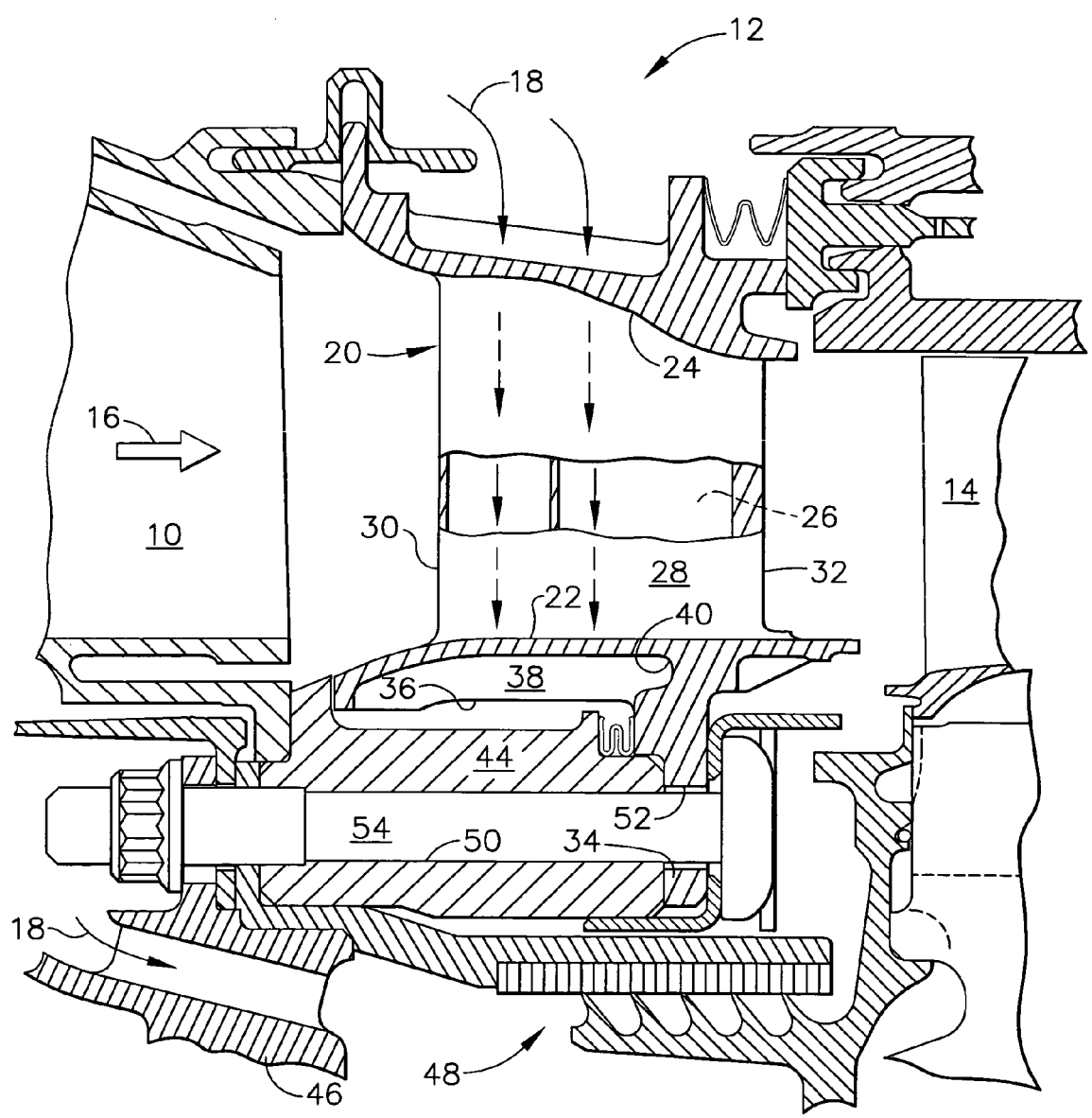
FIG. 1 is an axial sectional view of a portion of an axisymmetrical first stage turbine nozzle disposed at the outlet end of a combustor in a gas turbine engine.

Illustrated in FIG. 1 is an exemplary portion of a gas turbine engine which may be configured as an aircraft engine, or as an engine for marine and industrial applications. The engine is axisymmetrical about a longitudinal or axial centerline axis, and includes an annular combustor 10, shown in aft part, followed in turn by a first stage turbine nozzle 12, and row of first stage turbine rotor blades 14 disposed downstream therefrom. The turbine blades extend from the perimeter of a supporting rotor disk which in turn is joined by a shaft to an upstream compressor (not shown).

During operation, air is pressurized in the compressor and mixed with fuel in the combustor for generating hot combustion gases 16 which are discharged from the outlet end thereof into the turbine nozzle 12. A portion of the pressurized cooling air 18 is bled from the compressor for providing cooling air to the turbine nozzle for cooling the various components thereof.

Figure 2:
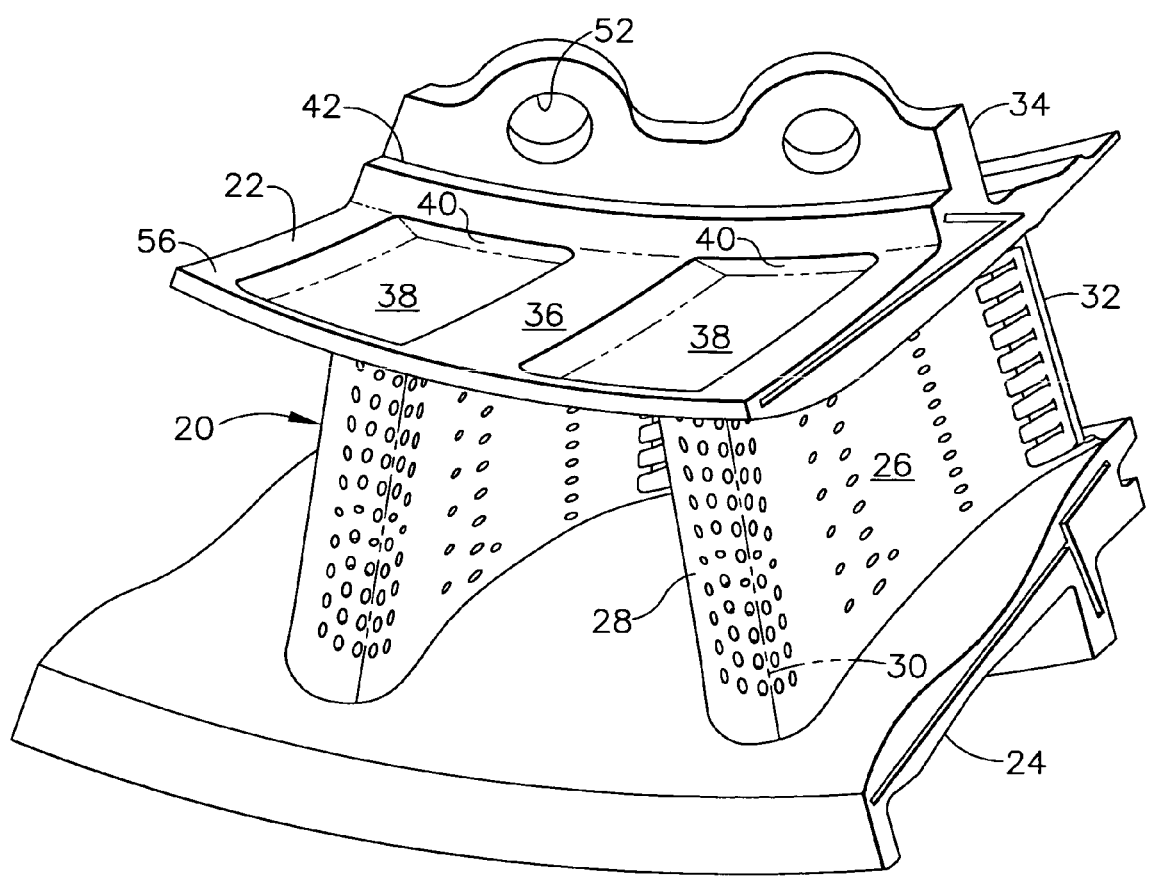
FIG. 2 is an isometric view of a circumferential segment of the turbine nozzle shown in FIG. 1 illustrating the radial undersides thereof.

The turbine nozzle 12 illustrated in FIGS. 1 and 2 includes a row of radial airfoils or vanes 20 integrally joined at opposite radial ends to a radially inner band 22 and a radially outer band 24. In a conventional configuration, the bands are formed in circumferential segments typically, with two vanes 20 per band segment, with the segments having axial splitlines suitably joined together by conventional spline seals therebetween.

Each vane 20 includes a generally concave pressure side 26 and circumferentially opposite, generally convex suction side 28 which extend axially in chord between opposite leading and trailing edges 30,32. The vanes extend radially between the bands, with the bands typically being integrally cast with the corresponding vanes during initial manufacture thereof. The vanes are spaced apart circumferentially to define flow passages for the hot combustion gases which are bound by the inboard surfaces of the inner and outer bands and the outer surfaces of the vanes.

In the exemplary embodiment illustrated in FIG. 1 the outer band 24 includes radially outwardly extending flanges at the forward and aft ends thereof which cooperate with adjacent members for providing suitable seals therewith in a conventional manner. The outer band is simply supported in the engine for unrestrained axial and radial movement with the adjacent components, with the vanes being fixedly mounted in the engine by the inner band 22.

The inner band includes an inner supporting or mounting flange 34 which extends radially inwardly from an inner surface 36 thereof, with the outer surface of the inner band defining the radial inner boundary for the hot combustion gases.

As best illustrated in FIG. 2, the inner band 22 also includes a generally rectangular recess or pocket 38 which adjoins the flange 34 for recessing only in part the inner surface 36. The pocket 38 in turn undercuts the flange 34 at the inner surface 36 to form a shallow cave or notch 40 at the base of the flange.

Figure 3:
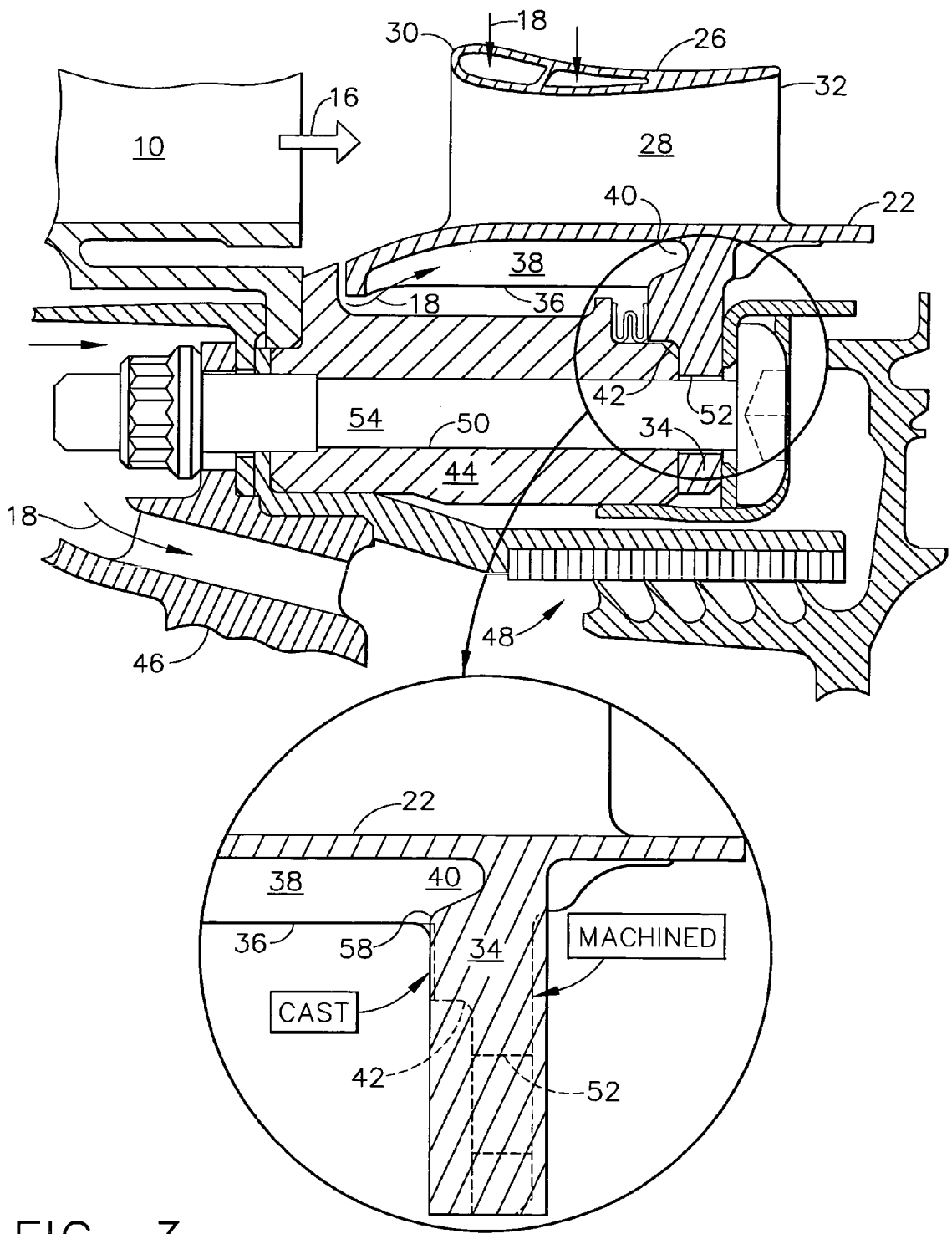
FIG. 3 is an enlarged axial sectional view of the mounting configuration for the turbine nozzle illustrated in FIG. 1.

As best illustrated in FIG. 3, the supporting flange 34 includes a machined notch or and the pocket in contrast has a cast configuration. As indicated above, each vane 20 and its band segments 22,24 are preferably manufactured in a unitary casting in the conventional lost wax method.

In this method, a ceramic core is used to define the internal features of the hollow vane. The external features of the vane and bands are defined by die halves and corresponding die inserts. Two overlapping die inserts are used to define the pocket 38 and the notch 40. And, wax is injected between the core and die elements to define the solid features of the nozzle following the casting process in which molten metal replaces the voids inside a ceramic shell initially occupied by the wax.

However, the pocket 38 preferably additionally includes the notch 40 at its aft end for extending the pocket under the base end of the supporting flange 34. In this way, the base of the inner flange is locally sculpted over the full circumferential extent of the pocket 38 for removing additional metal from the nozzle and thereby significantly reducing the weight of the nozzle. And, the local notch 40 under the inner flange substantially reduces the thermal mass of the inner flange in this region, which in turn enhances the cooling of the inner flange, and correspondingly reduces the thermal stresses generated therein during operation.

As shown in FIG. 3, the inner flange 34 is disposed adjacent the aft end of the inner band 22 below the trailing edge 32. The pocket 38 is disposed along the forward end of the inner band below the leading edge 30. The pocket 38, notch 40, and rabbet 42 are thusly disposed on the forward side of the inner flange 34.

Since the nozzle segment is initially cast, it has a corresponding surface finish due to such casting with a corresponding manufacturing tolerance therefor. In contrast, the rabbet 42 is precisely machined from the cast inner flange 34 as illustrated schematically in FIG. 3 to provide smooth radial and axial surfaces which define the 90 degree notch therebetween, with a corresponding manufacturing tolerance that is smaller or more precise than the casting tolerance disclosed above.

For example, machining tolerances may be a precise as a few mils or even a fraction of a mil, which is substantially smaller than typical casting tolerances which have a greater magnitude of several mils.

The precisely machined rabbet 42 illustrated in FIG. 3 is specifically configured for mounting the turbine nozzle to a complementary supporting ring 44 disposed concentrically inside the inner band 22. The supporting ring 44 is itself supported on an annular inducer 46, shown in radially outer part, which is fixedly mounted in the engine. The inducer may have any conventional configuration and typically includes a row of axial vanes (not shown) for channeling compressor discharge air to the first stage turbine rotor for providing cooling air to the turbine blades 14.

A conventional interstage labyrinth seal 48 is also disposed between the supporting ring 44 and the first stage turbine rotor disk. The interstage seal 48 may have any conventional configuration and typically includes a honeycomb seal plate suitably fixedly mounted to the supporting ring 44 which cooperates with labyrinth seal teeth fixedly mounted to the first stage turbine rotor. The teeth closely adjoin the honeycomb seal and provide an effective rotary seal therebetween during operation.

The supporting ring 44 illustrated in FIG. 3 includes a mounting hole 50 extending axially therethrough. A corresponding retainer hole 52 extends axially through the inner flange 34 radially below the rabbet 42 and is coaxially aligned with the mounting hole 50 of the ring.

A fastener 54 in the form of a threaded bolt with a nut thereon extends axially through the aligned mounting and retainer holes 50,52 and axially clamps the inner flange 34 to the supporting ring 44 for providing the reaction loadpath therethrough.

As shown in FIG. 3, the aft end of the supporting ring 44 has a machined perimeter which provides a circumferential ledge upon which sits the rabbet 42 of the inner flange 34. The machined surfaces of the ledge and rabbet precisely locate the turbine nozzle concentrically inside the engine around its axial centerline axis. And, the substantial operating loads in the turbine nozzle are carried radially inwardly through the inner band, inner flange, and the rabbet 42 thereof to the aft end of the supporting ring 44 which in turn carries the loads into the inner frame members of the engine.

FIG. 3 also illustrates that the aft side of the inner flange 34 is also precisely machined from its as cast configuration for accurately supporting the head of the fastener 54 thereon. The machined forward and aft surfaces of the distal end of the inner flange 34 thusly accurately position and support the turbine nozzle on the accurately machined supporting ring 44.

The retainer hole 52 in the inner flange is sufficiently large in diameter, with a clearance around the smaller fastener, to ensure that the radial reaction loads from the turbine nozzle are carried through the rabbet 42 to the supporting ring 44, and not through the fastener 54 itself. The fastener axially clamps the inner flange to the supporting ring for ensuring a rigid joint at the rabbet 42 through which all loads are carried.

FIG. 2 illustrates the underside of the typical nozzle segment in which the inner flange 34 extends circumferentially across the full width of the nozzle segment between its circumferentially opposite axial splitlines or faces. The flange 34, pocket 38, and notch 40 circumferentially or laterally bridge both vanes 20 between the opposite pressure and suction sides 26,28 thereof. As illustrated, there are two pockets 38 and corresponding notches 40 in the inner surface of each inner band segment corresponding with the two vanes, and the inner band is imperforate across the full extent of the pocket 38.

FIG. 2 also illustrates that the inner band 22 includes a rim 56 which surrounds each of the two pockets 38 on three sides thereof, with the rim being integrally joined to the common inner flange 34 at its middle and along the laterally opposite or outboard ends of the two notches 40. In this way, the inner flange 34 provides a continuous supporting structure over the entire circumferential width of the inner band which is integrally joined to the full thickness rim 56 of the inner band around the two partial thickness pockets 38.

The inner band remains rigid around the rim and integral inner flange for carrying reaction loads during operation, and is locally thin at the two pockets 38 and notch extensions thereof for reducing weight, reducing thermal mass, and improving cooling of the inner band and the inner flange 34 itself due to the local undercutting thereof.

As shown schematically in FIG. 3, suitable means are provided for channeling cooling air 18 into the pocket 38 and notch 40 for locally cooling the underside of the inner band 22 as well as locally cooling the inner flange 34 at its base end. For example, the radially outer supporting flange of the inducer 46 includes a series of axial holes therethrough through which the cooling air 18 is channeled from the compressor to the outer perimeter of the supporting ring 44. The pressurized cooling air then flows axially aft through the pocket 38 to the notch 40 where it locally cools the inner flange at its base or root with the inner band.

The notch 40 illustrated in FIG. 3 preferably undercuts the inner flange 34 only in part at the base thereof, and the base of the inner flange is otherwise imperforate or solid at the notch 40 for providing a closed or blind aft end therefor. It is noted that the aft side of the inner flange 34 is subject to a relatively hot purge air during operation, and it is not preferred that the notch 40 extend under the aft side of the inner flange, nor be disposed in flow communication with the aft side of the flange. By locating the notch 40 solely on the forward side of the inner flange, the pressurized cooling air is confined thereby for maximizing the cooling effectiveness of that air prior to its return to the turbine flowpath.

In the preferred embodiment illustrated in FIG. 3, the notch 40 converges in axial or transverse section from the upstream pocket 38 downstream into the base of the flange 34.

Furthermore, the inner band 22 has a generally uniform thickness along the pocket 38 and notch 40, with the outer surface of the notch 40 being generally parallel with the outer surface of the inner band 22 over which the combustion gases flow during operation. Correspondingly, the flange 34 includes a radius 58 which varies or blends in profile from the forward side of the inner flange along the notch 40 for defining the inner surface thereof which converges aft towards the outer surface of the notch.

In this configuration, the base end of the inner flange blends at the notch 40 to the inner band with a relatively large radius for maintaining an effective loadpath without locally increasing undesirable stress thereat. And, the radius 58 permits removal of the die insert from the molded wax defining the notch 40 without damaging the wax during this step in the conventional lost wax casting process.

Another advantage of introducing the notch 40 at the base of the inner flange 34 is locally increasing the extent of the pocket 38 and the relatively thin wall of the inner band thereat. The thermal mass of the inner band is thusly reduced at the notch 40, and the notch 40 permits film cooling holes to be formed through the inner band more closely adjacent to the inner flange within the extent of the notch 40 itself. Film cooling holes may be formed in a conventional manner through the inner or outer bands, or both, for providing film cooling thereof, with the pockets 38 preferably being imperforate without the introduction of film cooling holes therein. Since the pockets 38 are disposed under corresponding ones of the hollow vanes 20, internal cooling of the vanes in conventional manner additionally cools the pocket regions of the inner bands from inside the vanes.

The simple introduction of the undercut notch 40 locally into the base of the supporting inner flange 34 of the turbine nozzle disclosed above substantially reduces the weight of the nozzle, and reduces the thermal mass at the junction of the inner band and inner flange, and thereby improves cooling of the inner band.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A turbine nozzle comprising:
   a vane integrally joined at opposite ends to circumferentially extending inner and outer bands;
   said inner band including an inner mounting flange extending circumferentially from an inner surface thereof, and a pocket adjoining said flange for recessing in part said inner surface; and
   said pocket undercutting said flange at said inner surface to form a notch at the base thereof.

2. A nozzle according to claim 1 wherein said flange comprises a machined rabbet at a distal end thereof spaced from said pocket, and said pocket has a cast configuration.

3. A nozzle according to claim 2 wherein:
   said vane comprises opposite pressure and suction sides extending in chord between opposite leading and trailing edges;
   said flange is disposed adjacent an aft end of said inner band below said trailing edge;
   said pocket is disposed along a forward end of said inner band below said leading edge; and
   said notch and rabbet are disposed on the forward side of said flange.

4. A nozzle according to claim 3 wherein said flange, pocket, and notch laterally bridge said vane between said opposite pressure and suction sides, and said inner band is imperforate across said pocket.

5. A nozzle according to claim 4 wherein said inner band includes a rim surrounding said pocket, and integrally joined to said flange outboard of said notch.

6. A nozzle according to claim 5 wherein said notch undercuts said flange only in part at said base thereof, and said base is imperforate at said notch.

7. A nozzle according to claim 6 wherein said notch converges in transverse section from said pocket into said flange.

8. A nozzle according to claim 7 wherein said inner band has a uniform thickness along said pocket and notch, and said flange includes a radius from said forward side thereof along said notch.

9. A nozzle according to claim 8 further comprising:
   a supporting ring disposed inside said inner band, and including a mounting hole extending axially therethrough; and
   said inner band is supported by said rabbet at an aft end of said ring, and said inner flange extends radially inwardly over said mounting hole.

10. A nozzle according to claim 9 further comprising a retainer hole extending axially through said flange below said rabbet and aligned with said mounting hole, and a retaining fastener extending through said aligned holes and clamping said flange to said ring.

11. A turbine nozzle comprising:
   a row of vanes integrally joined at opposite ends to circumferentially extending inner and outer bands;

said inner band including an inner mounting flange extending circumferentially from an inner surface thereof; and a pocket adjoining said flange for recessing in part said inner surface; and said pocket undercutting said flange at said inner surface to form a converging notch at the base thereof.

12. A nozzle according to claim 11 wherein:

each of said vanes comprises opposite pressure and suction sides extending in chord between opposite leading and trailing edges;

said flange is disposed adjacent an aft end of said inner band below said trailing edge;

said pocket is disposed along a forward end of said inner band below said leading edge; and said notch is disposed on the forward side of said flange.

13. A nozzle according to claim 12 wherein said notch undercuts said flange only in part at said base thereof, and said base is imperforate at said notch.

14. A nozzle according to claim 13 wherein said flange, pocket, and notch laterally bridge said vane between said opposite pressure and suction sides, and said inner band is imperforate across said pocket.

15. A nozzle according to claim 14 wherein said inner band includes a rim surrounding said pocket, and integrally joined to said flange outboard of said notch.

16. A nozzle according to claim 15 wherein:

said inner band has a uniform thickness along said pocket and notch;

said flange includes a radius from said forward side thereof along said notch; and said notch converges in transverse section along said radius into said flange.

17. A nozzle according to claim 16 wherein said flange comprises a machined rabbet at a distal end thereof spaced from said pocket, and said pocket has a cast configuration.

18. A nozzle according to claim 17 further comprising:

a supporting ring disposed inside said inner band, and including a mounting hole extending axially therethrough; and said inner band is supported by said rabbet at an aft end of said ring, and said inner flange extends radially inwardly over said mounting hole.

19. A nozzle according to claim 18 further comprising a retainer hole extending axially through said flange below said rabbet and aligned with said mounting hole, and a retaining fastener extending through said aligned holes and clamping said flange to said ring.

20. A nozzle according to claim 19 further comprising means for channeling cooling air into said pocket and notch for cooling said inner band and said flange at said base thereof.

* * * * *